(12) United States Patent
Fukumura et al.

(10) Patent No.: US 8,577,527 B2
(45) Date of Patent: Nov. 5, 2013

(54) DRIVE CONTROL DEVICE FOR A VEHICLE

(75) Inventors: Mitsumasa Fukumura, Susono (JP); Shoichi Sasaki, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 528 days.

(21) Appl. No.: 12/670,883

(22) PCT Filed: Oct. 14, 2008

(86) PCT No.: PCT/JP2008/068598
§ 371 (c)(1), (2), (4) Date: Jan. 27, 2010

(87) PCT Pub. No.: WO2009/051113
PCT Pub. Date: Apr. 23, 2009

(65) Prior Publication Data
US 2010/0174431 A1    Jul. 8, 2010

(30) Foreign Application Priority Data

Oct. 16, 2007  (JP) ................................ 2007-268816

(51) Int. Cl.
*G06F 7/00* (2006.01)

(52) U.S. Cl.
USPC ............. 701/22; 701/1; 701/102; 123/90.15; 123/90.17; 123/90.18; 123/179.3; 123/198 R; 74/425; 180/65.2; 180/65.8; 192/70.25; 310/166; 318/727; 318/807; 331/1 A; 388/813

(58) Field of Classification Search
USPC ............. 701/1, 102; 123/90.15, 90.17, 90.18, 123/179.3, 198 R; 74/425; 180/65.2, 65.8; 192/70.25; 310/166; 318/727, 807; 331/1 A; 388/813
See application file for complete search history.

(56) References Cited

U.S. PATENT DOCUMENTS 3,602,994 A * 9/1971 Layman ............................ 327/4
3,931,585 A * 1/1976 Barker et al. ................. 331/1 A
(Continued)

FOREIGN PATENT DOCUMENTS

JP    2004 345527    12/2004
JP    2006 9942      1/2006
(Continued)

OTHER PUBLICATIONS

"Torque Converter" definition from Access Science Encyclopedia, 2 pages, published by McGraw Hill Companies.*

*Primary Examiner* — James Trammell
*Assistant Examiner* — Sanjeev Malhotra
(74) *Attorney, Agent, or Firm* — Oblon, Spivak, McClelland, Maier & Neustadt, L.L.P.

(57) ABSTRACT

A drive control device which estimates an engine torque during traveling in a fixed gear ratio mode is disclosed. The drive control device includes the engagement mechanism including the revolution component revolved by the torque of the engine and the fixed component that engages with the revolution component, the torque applying unit which applies torque to the revolution component and the first transmitting control unit which engages the engagement mechanism to make the engagement mechanism receive the reaction force of the torque. The torque estimating control unit executes control of torque applied to the revolution component by the torque applying unit during executing the control by the first transmitting control unit to detect the phase change between the revolution component and the fixed component and estimates the torque of the engine based on the phase change and torque applied by the torque applying unit.

11 Claims, 6 Drawing Sheets

(56) References Cited

U.S. PATENT DOCUMENTS

| | | | |
|---|---|---|---|
| 5,093,891 A * | 3/1992 | Komiyama et al. | 388/813 |
| 6,155,220 A * | 12/2000 | Marriott | 123/90.17 |
| 6,161,640 A * | 12/2000 | Yamaguchi | 180/65.8 |
| 2001/0011625 A1* | 8/2001 | Naito et al. | 192/70.25 |
| 2001/0042528 A1* | 11/2001 | Takahashi | 123/90.15 |
| 2002/0030416 A1* | 3/2002 | Jinupun | 310/166 |
| 2002/0039013 A1* | 4/2002 | Murata et al. | 318/727 |
| 2002/0174843 A1* | 11/2002 | Iwaki et al. | 123/90.17 |
| 2002/0189563 A1* | 12/2002 | Muraki et al. | 123/90.18 |
| 2003/0078135 A1* | 4/2003 | Yang | 477/5 |
| 2003/0109357 A1* | 6/2003 | Tabata | 477/109 |
| 2003/0145815 A1* | 8/2003 | Miyakoshi | 123/90.17 |
| 2003/0154945 A1* | 8/2003 | Ando et al. | 123/179.3 |
| 2005/0049761 A1* | 3/2005 | Kataoka et al. | 701/1 |
| 2005/0066933 A1* | 3/2005 | Kaita et al. | 123/198 R |
| 2005/0099153 A1* | 5/2005 | Komatsu et al. | 318/807 |
| 2005/0235767 A1* | 10/2005 | Shimizu et al. | 74/425 |
| 2006/0048982 A1* | 3/2006 | Yamamoto et al. | 180/65.2 |
| 2008/0071463 A1* | 3/2008 | Tanaka et al. | 701/102 |
| 2008/0254936 A1* | 10/2008 | Yang | 477/5 |
| 2009/0318261 A1* | 12/2009 | Tabata et al. | 477/3 |

FOREIGN PATENT DOCUMENTS

| | | |
|---|---|---|
| JP | 2007 45284 | 2/2007 |
| WO | 00 39444 | 7/2000 |

\* cited by examiner

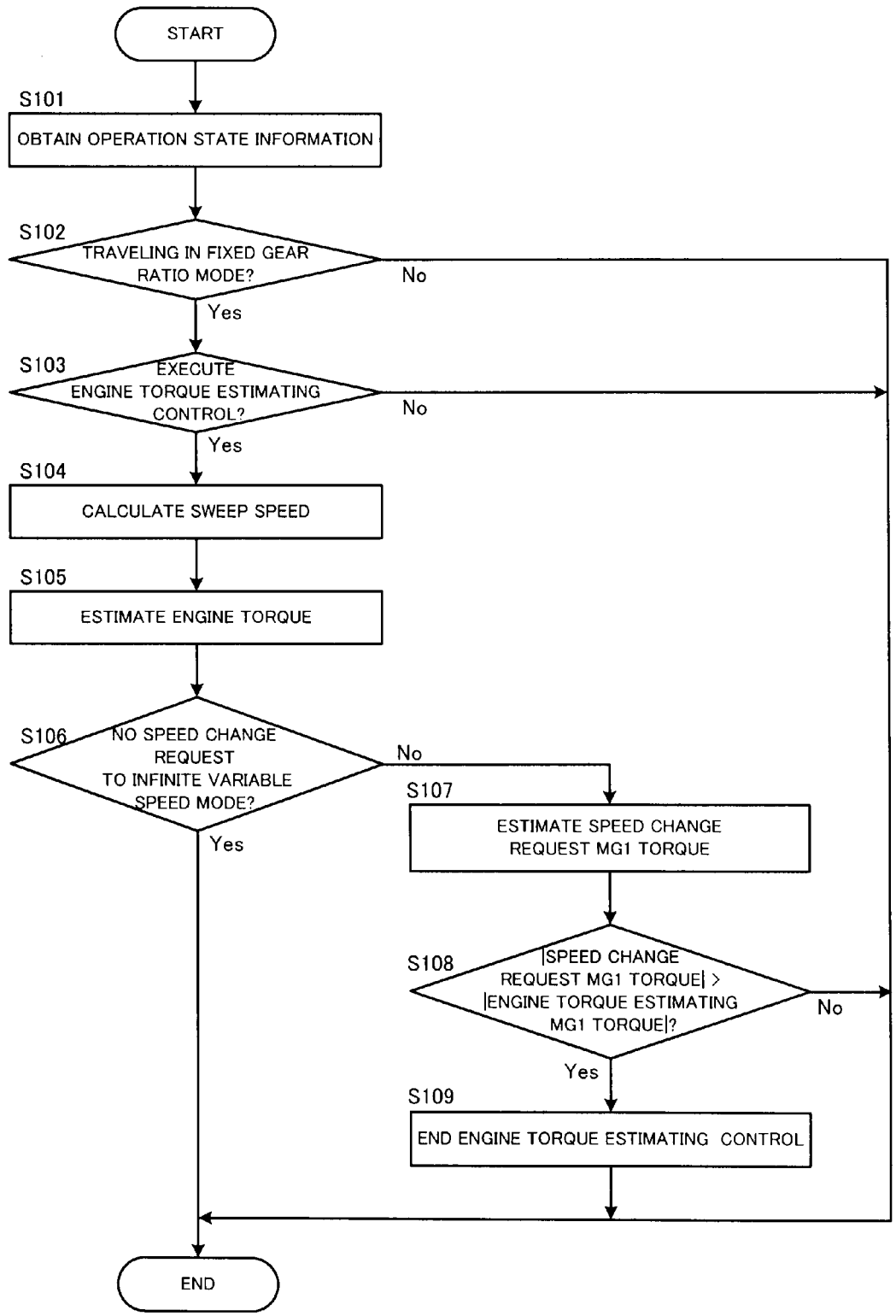

DRIVE CONTROL DEVICE FOR A VEHICLE

TECHNICAL FIELD

The present invention relates to a drive control device preferred for a hybrid vehicle.

BACKGROUND TECHNIQUE

There is known a hybrid vehicle including a power source such as an electromotor and a motor generator, in addition to an internal combustion engine. In the hybrid vehicle, while the internal combustion engine operates as efficiently as possible, excess and deficiency of a driving force and an engine braking force are adjusted by the electromotor and/or the motor generator.

As for the above hybrid vehicle, there is disclosed an example of a speed change mechanism capable of operating with switching an infinite variable speed mode and a fixed gear ratio mode in Patent Reference-1. Concretely, a power distribution mechanism including four revolution components is formed by combining two planetary gear mechanisms, and the four revolution components are connected to an engine, a first motor generator, an output axis and a brake, respectively. In such a state that the brake is released, the number of revolutions of the engine continuously changes by continuously changing the number of revolutions of the first motor generator, and the operation in the infinite variable speed mode is executed. Meanwhile, in such a state that the brake is fixed, the gear ratio is fixed by preventing the revolution of one of the above-mentioned revolution components, and the operation in the fixed gear ratio mode is executed. In addition, as the speed change mechanism for switching the infinite variable speed mode and the fixed gear ratio mode, there is known a speed change mechanism which applies not a normal wet multiple disc clutch but an engagement mechanism for engaging teeth of the revolution component and teeth of the fixed component.

In Patent Reference-2, there is disclosed a technique for a hybrid vehicle which calculates an engine torque based on a reaction force of a torque of an electromotor (first motor generator).

However, in the technique disclosed in Patent Reference-1, it is sometimes impossible to appropriately estimate the engine torque in such a state that teeth of the revolution component and teeth of the fixed component are engaging, i.e., in such a state that the fixed gear ratio mode is set. This is because, since the reaction torque of the engine is mechanically supported, not by the first motor generator, but by the engaging mechanism during traveling in the fixed gear ratio mode (in this case, the first motor generator outputs little torque), it is difficult to estimate the engine torque by using the torque of the first motor generator. There is not disclosed a method of estimating the engine torque with high accuracy during traveling in the fixed gear ratio mode in Patent Reference-2, too.

Patent Reference-1: Japanese Patent Application Laid-open under No. 2004-345527

Patent Reference-2: International Patent Application Laid-open under No. 2000/39444

DISCLOSURE OF INVENTION

Problem to be Solved by the Invention

The present invention has been achieved in order to solve the above problem. It is an object of this invention to provide a drive control device for a vehicle capable of estimating an engine torque with high accuracy during traveling in a fixed gear ratio mode.

According to one aspect of the present invention, there is provided a drive control device for a vehicle including: an engagement mechanism which includes a revolution component that has plural teeth and is revolved by a torque of an internal combustion engine, and a fixed component that has plural teeth and engages with the revolution component; a torque applying unit which applies a torque to the revolution component; a first transmitting control unit which engages the engagement mechanism to make the engagement mechanism receive a reaction force of the torque of the internal combustion engine, and executes a control for transmitting the torque of the internal combustion engine to wheels; and a torque estimating control unit which executes a control for estimating the torque of the internal combustion engine, wherein the torque estimating control unit including: a torque applying control unit which executes a control of the torque applied to the revolution component by the torque applying unit during executing the control by the first transmitting control unit; a phase change detecting unit which detects a phase change between the revolution component and the fixed component in a direction of rotation during executing the control by the torque applying control unit; and a torque estimating unit which estimates the torque of the internal combustion engine based on the phase change detected by the phase change detecting unit and the torque applied by the torque applying unit by the control of the torque applying control unit during executing the control by the first transmitting control unit.

The above drive control device is mounted on the hybrid vehicle including the engine and the motor generator as the driving source. Concretely, the drive control device includes the engagement mechanism including the revolution component that is revolved by the torque of the internal combustion engine and the fixed component that engages with the revolution component, the torque applying unit which applies the torque to the revolution component and the first transmitting control unit which engages the engagement mechanism to make the engagement mechanism receive the reaction force of the torque of the internal combustion engine, and executes the control for transmitting the torque of the internal combustion engine to wheels. Additionally, the torque estimating control unit executes the control of the torque applied to the revolution component by the torque applying unit during executing the control by the first transmitting control unit thereby to detect the phase change between the revolution component and the fixed component in a direction of rotation, and estimates the torque of the internal combustion engine based on the phase change and the torque applied by the torque applying unit. By the above drive control device, it becomes possible to estimate the torque of the internal combustion engine with high accuracy in such a state that the revolution component and the fixed component are engaging.

In a manner of the above drive control device, the torque applying control unit executes the control of the torque applied to the revolution component by the torque applying unit so that the phase change is smaller than a backlash between teeth of the revolution component and teeth of the fixed component. Thereby, it is possible to suppress a shock during the estimation of the torque of the internal combustion engine.

In another manner of the above drive control device, when a change of an operation point of the internal combustion engine becomes equal to or larger than a predetermined value, the torque estimating control unit executes the control for estimating the torque. Thereby, it is possible to decrease the execution frequency of the control for estimating the torque of the internal combustion engine, and it becomes possible to suppress a deterioration of fuel consumption caused by the execution of the control.

In another manner, the drive control device may further include a second transmitting control unit which releases the engagement mechanism to make the torque applying unit receive a reaction force of the torque of the internal combustion engine and a switching unit which switches from the control by the first transmitting control unit to the control by the second transmitting control unit, when an absolute value of the torque which the applying unit should apply in order to switch from the control by the first transmitting control unit to the control by the second transmitting control unit becomes larger than an absolute value of the torque applied by the torque applying unit during the control by the torque estimating control unit. Thereby, it becomes possible to quickly switch from the control by the first transmitting control unit to the control by the second transmitting control during the execution of the control for estimating the torque of the internal combustion engine.

In another manner of the above drive control device, the torque applying control unit controls a speed of changing the torque applied by the torque applying unit based on a relation between the torque which the torque applying unit is presently applying and a target torque which the torque applying unit should apply to change the phase between the revolution component and the fixed component. Thereby, it is possible to suppress the occurrence of the change of the output axis during the estimation of the torque and shorten the time required to estimate the torque.

In another manner, the drive control device may further include a unit which generates a torque so that the torque applied by the torque applying unit is compensated during the control by the torque applying control unit. Thereby, it is possible to efficiently suppress the occurrence of the change of the output axis during the estimation of the torque.

In a preferred example, a motor generator can be used as the above torque applying unit.

Effect of the Invention

The drive control device according to the present invention includes the engagement mechanism including the revolution component that is revolved by the torque of the internal combustion engine and the fixed component that engages with the revolution component, the torque applying unit which applies the torque to the revolution component and the first transmitting control unit which engages the engagement mechanism to make the engagement mechanism receive the reaction force of the torque of the internal combustion engine, and executes the control for transmitting the torque of the internal combustion engine to wheels. The drive control device executes the control of the torque applied to the revolution component by the torque applying unit during executing the control by the first transmitting control unit thereby to detect the phase change between the revolution component and the fixed component in a direction of rotation, and estimates the torque of the internal combustion engine based on the phase change and the torque applied by the torque applying unit. Therefore, it becomes possible to estimate the torque of the internal combustion engine with high accuracy in such a state that the revolution component and the fixed component are engaging.

BRIEF DESCRIPTION OF THE DRAWINGS

FIG. 9 is a flow chart showing an engine torque estimating control process.

BRIEF DESCRIPTION OF THE REFERENCE NUMBER

1 Engine
3 Output Axis
4 ECU
7 Brake Unit
31 Inverter
32, 34 Converter
33 HV Battery
20 Power Distribution Mechanism
MG1 First Motor Generator
MG2 Second Motor Generator

DETAILED DESCRIPTION OF THE PREFERRED EMBODIMENTS

A preferred embodiment of the present invention will be explained hereinafter with reference to the drawings.
[Device Configuration]

Figure 1:
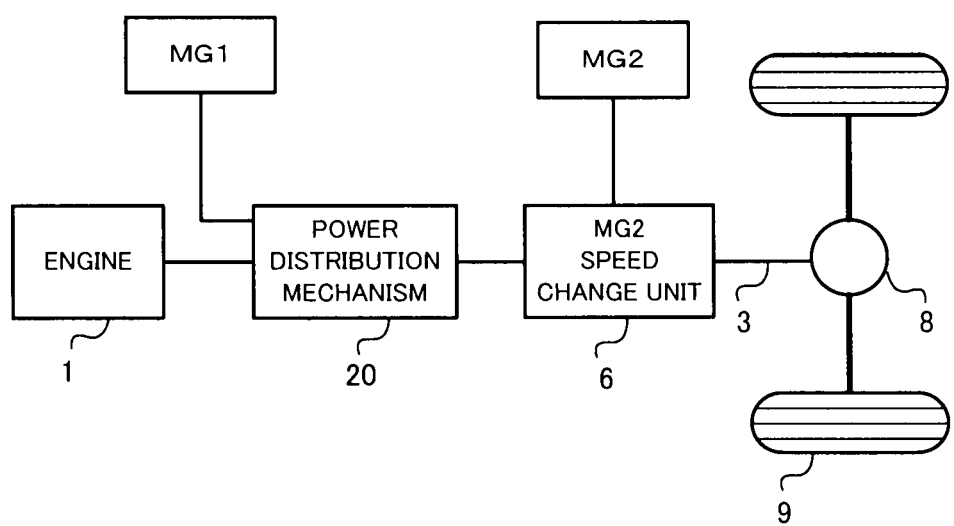
FIG. 1 shows a schematic configuration of a hybrid vehicle according to an embodiment.

FIG. 1 shows a schematic configuration of a hybrid vehicle to which the present invention is applied. An example of FIG. 1 is the hybrid vehicle referred to as a mechanical distribution double-motor type, including an engine (internal combustion engine) 1, a first motor generator MG1, a second motor generator MG2 and a power distribution mechanism 20. The engine 1 serving as a power source and the first motor generator MG1 serving as a revolution number control mechanism are connected to the power distribution mechanism 20. The second motor generator MG2 serving as a sub power source for assisting a driving torque or a braking force is connected to the output axis 3 of the power distribution mechanism 20. The second motor generator MG2 and the output axis 3 are connected via a MG2 speed change unit 6. Further, the output axis 3 is connected to right and left driving wheels 9 via a final decelerator 8. The first motor generator MG1 and the second motor generator MG2 are electrically connected to each other via a battery, an inverter or an appropriate controller (see FIG. 2) or directly, and they are formed so that the power generated in the first motor generator MG1 drives the second motor generator MG2. The first motor generator MG1 corresponds to the torque applying unit.

The engine 1 is a heat engine which combusts fuel and generates the power, e.g., a gasoline engine and a diesel engine. Mainly, the first motor generator MG1 receives the torque from the engine 1, and revolves to generate the power. At this time, reaction power of the torque caused by the power generation operates on the first motor generator MG1. By controlling the number of revolutions of the first motor generator MG1, the number of revolutions of the engine 1 continuously changes. Such a speed change mode is referred to as the infinite variable speed mode. The infinite variable speed mode is realized by a differential operation of the power distribution mechanism 20, which will be described later.

The second motor generator MG2 is the device which assists the driving torque or the braking force. When assisting the driving torque, the second motor generator MG2 receives the power supply to function as an electromotor. Meanwhile, when assisting the braking force, the second motor generator MG2 is revolved by the torque transmitted from the driving wheels 9, and functions as a generator which generates the power.

Figure 2:
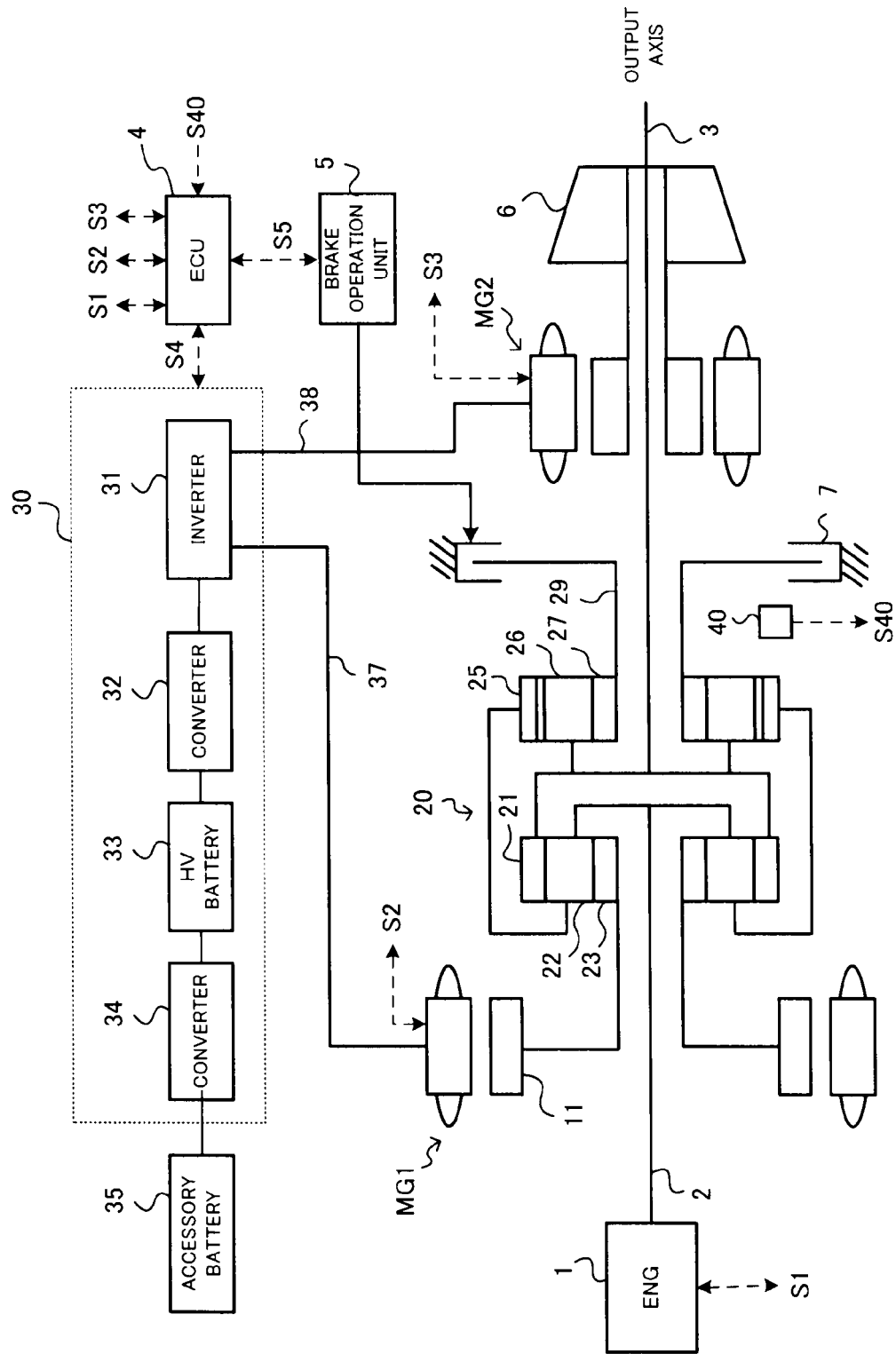
FIG. 2 shows a configuration of a motor generator and a power transmission mechanism.

FIG. 2 shows the configuration of the first and second motor generators MG1 and MG2 and the power distribution mechanism 20, shown in FIG. 1.

The power distribution mechanism 20 distributes the output torque of the engine 1 to the first motor generator MG1 and the output axis 3, and is formed so that the differential operation occurs. Concretely, the power distribution mechanism 20 has a plural pairs of differential mechanisms, and in four revolution components mutually generating the differential operation, the engine 1 is connected to the first revolution component, and the first motor generator MG1 is connected to the second revolution component. Also, the output axis 3 is connected to the third revolution component. The fourth revolution component is fixable by the brake unit 7. The brake unit 7 includes the fixed component, and is controlled by the brake operation unit 5. For example, the brake unit 7 is formed by a dog clutch. In such a state that the brake unit 7 does not fix the fourth revolution component, the number of revolutions of the engine 1 continuously changes by continuously changing the number of revolutions of the first motor generator MG1, and the infinite variable speed mode is realized. Meanwhile, in such a state that the brake unit 7 fixes the fourth revolution component, the speed gear ratio determined by the power distribution mechanism 20 is fixed in an overdrive state (i.e., in such a state that the number of engine revolutions becomes smaller than the number of output revolutions), and the fixed gear ratio mode is realized.

In this embodiment, as shown in FIG. 2, the power distribution mechanism 20 is formed by combining two planetary gear mechanisms. The first planetary gear mechanism includes a ring gear 21, a carrier 22 and a sun gear 23. The second planetary gear mechanism, which is a double-pinion type, includes a ring gear 25, a carrier 26 and a sun gear 27.

The output axis 2 of the engine 1 is connected to the carrier 22 of the first planetary gear mechanism, and the carrier 22 is connected to the ring gear 25 of the second planetary gear mechanism. They form the first revolution component. A rotor 11 of the first motor generator MG1 is connected to the sun gear 23 of the first planetary gear mechanism. They form the second revolution component.

The ring gear 21 of the first planetary gear mechanism and the carrier 26 of the second planetary gear mechanism are connected to each other, and are also connected to the output axis 3. They form the third revolution component. Further, the sun gear 27 of the second planetary gear mechanism is connected to the revolution axis 29. They form the fourth revolution component with the revolution axis 29. The revolution axis 29 is fixable by the brake unit 7.

A power source unit 30 includes an inverter 31, a converter 32, an HV battery 33 and a converter 34. The first motor generator MG1 is connected to the inverter 31 by a power source line 37, and the second motor generator MG2 is connected to the inverter 31 by a power source line 38. In addition, the inverter 31 is connected to the converter 32, and the converter 32 is connected to the HV battery 33. Moreover, the HV battery 33 is connected to an accessory battery 35 via the converter 34.

The inverter 31 gives and receives the power to and from the motor generators MG1 and MG2. At the time of regenerating the motor generators, the inverter 31 converts, to the direct current, the power generated by the regeneration of the motor generators MG1 and MG2, and supplies it to the converter 32. The converter 32 converts the voltage of the power supplied from the inverter 31, and charges the HV battery 33. Meanwhile, at the time of powering the motor generators, the voltage of the direct current power outputted from the HV battery 33 is raised by the converter 32, and is supplied to the motor generator MG1 or MG2 via the power source line 37 or 38.

The voltage of the power of the HV battery 33 is converted by the converter 34, and is supplied to the accessory battery 35 to be used for driving various kinds of accessories.

The operations of the inverter 31, the converter 32, the HV battery 33 and the converter 34 are controlled by an ECU 4. The ECU 4 transmits a control signal S4, and controls the operation of each of the components in the power source unit 30. In addition, the signal necessary to show the state of each component in the power source unit 30 is supplied to the ECU 4 as the control signal S4. Concretely, a SOC (State Of Charge) showing the state of the HV battery 33 and an input/output limit value of the battery are supplied to the ECU 4 as the control signal S4.

In the brake unit 7, a revolution sensor 40 which detects a phase change between the fourth revolution component (such as the revolution axis 29) and the fixed component (brake unit 7) is provided. The revolution sensor 40 supplies a detecting signal S40 corresponding to the detected phase change to the ECU 4.

The ECU 4 transmits and receives control signals S1 to S3 with the engine 1, the first motor generator MG1 and the second motor generator MG2, and controls them. In addition, the ECU 4 supplies a brake operation instruction signal S5 to the brake operation unit 5. The brake operation unit 5 operates the brake unit 7 based on the brake operation instruction signal S5, and controls engagement/release of the revolution axis 29 being the fourth revolution component. The ECU 4 corresponds to the torque estimating control unit, the first transmitting control unit, the second transmitting control unit and the switching unit in the present invention, which will be described in details, later.

[Engine Torque Estimating Control]

Next, a description will be given of the engine torque estimating control according to the embodiment. In this embodiment, the control for estimating the engine torque is executed in such a state that the teeth of the revolution component and the teeth of the fixed component are engaging, i.e., during travelling in the fixed gear ratio mode. The engine torque estimating control is executed by the above-mentioned ECU 4.

Figure 3:
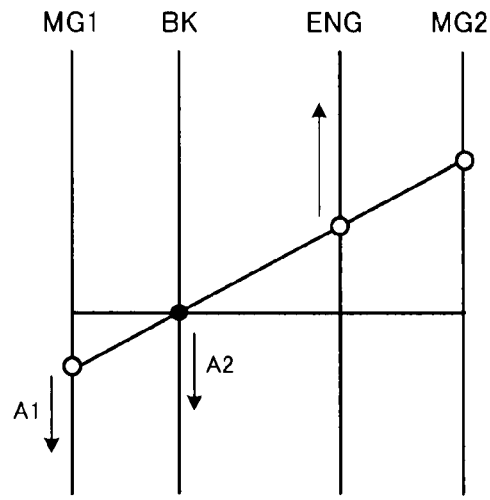
FIG. 3 shows an alignment chart in a fixed gear ratio mode of a power distribution mechanism.

Now, a description will be given of a problem at the time of estimating the engine torque in the fixed gear ratio mode, with reference to FIG. 3. FIG. 3 shows an alignment chart in the fixed gear ratio mode of the power distribution mechanism 20. In the fixed gear ratio mode, as shown by a black dot in FIG. 3, the brake unit 7 is fixed by engaging the engaging mechanism (the fourth revolution component and the fixed component). In case of setting the fixed gear ratio mode, it is difficult to appropriately estimate the engine torque. The reason will be described below. In the infinite variable speed mode, as shown by an arrow A1 in FIG. 3, the reaction force of the engine torque is supported by the first motor generator MG1 (Though FIG. 3 shows the alignment chart in the fixed gear ratio mode, as a matter of convenience of the explanations, the description is given of the infinite variable speed mode using this figure). Therefore, it is possible to calculate the engine torque with high accuracy based on the torque of the first motor generator MG1. Namely, in the infinite variable speed mode, it is possible to use the first motor generator MG1 as a sensor for estimating the engine torque.

However, in the fixed gear ratio mode, since the reaction force of the engine torque is mechanically supported by the brake unit 7 as shown by an arrow A2 in FIG. 3, it is difficult to calculate the engine torque based on the torque of the first motor generator MG1. Namely, since the first motor generator MG1 outputs little torque in this case, it is impossible to use the first motor generator MG1 as the sensor for estimating the engine torque like the above-mentioned infinite variable speed mode, and it is difficult to estimate the engine torque with high accuracy. If the engine torque cannot be estimated with high accuracy, the speed change shock is caused by the speed change and/or the input and output of the power is unbalanced at the time of performing the speed change between the infinite variable speed mode and the fixed gear ratio mode.

So, in this embodiment, the ECU 4 executes the control for estimating the engine torque with high accuracy during travelling in the fixed gear ratio mode. Concretely, the ECU 4 makes the first motor generator MG1 apply the torque (hereinafter suitably referred to as "MG1 torque") to the fourth revolution component during travelling in the fixed gear ratio mode, and estimates the engine torque based on the phase change between the fourth revolution component and the fixed component which occurs at this time. In details, in such a case that the ECU 4 sweeps the MG1 torque while monitoring the phase change, the ECU 4 estimates the engine torque based on the MG1 torque at the time that the phase change is smaller than a backlash between the teeth of the fourth revolution component and the teeth of the fixed component.

Figure 4:
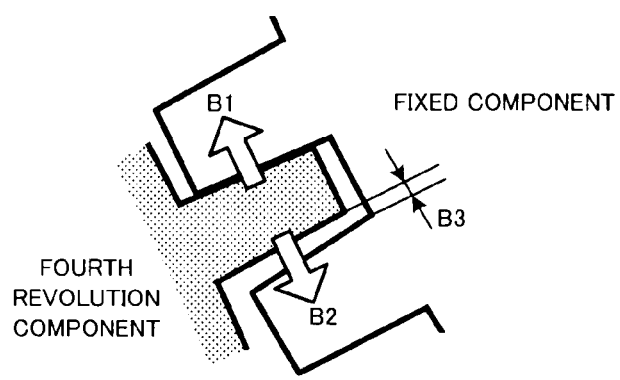
FIG. 4 shows a diagram for explaining a fundamental concept of an engine torque estimating control.

FIG. 4 is a diagram for explaining a fundamental concept of the engine torque estimating control according to this embodiment. FIG. 4 shows a part of the teeth of the fourth revolution component and part of the teeth of the fixed component (brake unit 7). In this case, the teeth of the fourth revolution component are engaging with the teeth of the fixed component, i.e., the fixed gear ratio mode is set. In the fixed gear ratio mode, the torque as shown by an arrow B1 in FIG. 4 basically acts between the fourth revolution component and the fixed component, and the reaction force of the engine torque is mechanically supported by the brake unit 7. In this embodiment, in order to estimate the engine torque during traveling in the fixed gear ratio mode, the ECU 4 executes the control of the first motor generator MG1 so that the MG1 torque as shown by an arrow B2 opposite to the arrow B1 is applied to the fourth revolution component. Concretely, the ECU 4 executes the control of the first motor generator MG1 so that the MG1 torque gradually changes. In details, if the direction of the arrow B1 is a positive direction and the direction of the arrow B2 is a negative direction, the ECU 4 executes the control of the first motor generator MG1 so that the MG1 torque gradually decreases (i.e., the torque which acts in the direction opposite to the arrow B1 gradually increases).

Therefore, the torque which acts between the fourth revolution component and the fixed component as shown by an arrow B1 gradually decreases. Then, when the MG1 torque becomes equal to the torque corresponding to the reaction force of the engine torque, a support torque of the engagement mechanism becomes substantially 0. Afterward, the fourth revolution component moves with respect to the fixed component, i.e., the phase between the fourth revolution component and the fixed component changes. Concretely, the phase between the fourth revolution component and the fixed component changes up to the value corresponding to a backlash B3 between the teeth of the fourth revolution component and the teeth of the fixed component.

In this embodiment, the ECU 4 estimates the engine torque based on the applied MG1 torque at the time that the phase changes in this manner. This is because, since the MG1 torque becomes equal to the torque corresponding to the reaction force of the engine torque when the phase change between the fourth revolution component and the fixed component occurs, it is possible to estimate the engine torque from the MG1 torque with high accuracy. By executing the estimation of the engine torque in this manner, it is possible to estimate the engine torque with high accuracy during traveling in the fixed gear ratio mode, and it becomes possible to efficiently suppress the speed change shock by the speed change and the unbalance of the power input/output.

Next, a concrete description will be given of the engine torque estimating control according to the embodiment, with reference to FIG. 5 to FIG. 8.

Figure 5:
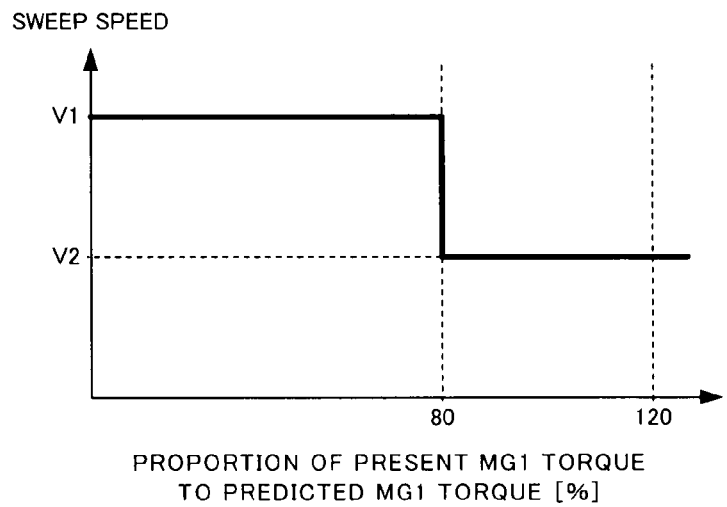
FIG. 5 shows an example of a sweep speed of a MG1 torque.

A description will be given of a speed of changing the MG1 torque (hereinafter referred to as "sweep speed") by using FIG. 5. In this embodiment, the ECU 4 sets the sweep speed of the MG1 torque, based on a relation between the applied MG1 torque and a predicted MG1 torque (target torque) which is predicted based on the instruction value of the engine power. Concretely, when the MG1 torque is away from the predicted MG1 torque to some extent, the ECU 4 changes the MG1 torque relatively quickly. Namely, the ECU 4 quickly changes the MG1 torque to the value around the predicted MG1 torque. This is done in order to shorten the time required to estimate the engine torque.

Meanwhile, when the MG1 torque is close to the predicted MG1 torque, the ECU 4 changes the MG1 torque relatively slowly. Namely, in such a case that the MG1 torque becomes the value close to the predicted MG1 torque by changing the MG1 torque, the ECU 4 decreases the sweep speed of the MG1 torque. This is done in order to prevent the phase change from becoming larger than the backlash, when the ECU 4 stops applying the MG1 torque by detecting the phase change between the fourth revolution component and the fixed component. Namely, this is to stop the fourth revolution component before the teeth of the fourth revolution component collide with the opposite sides of the teeth of the fixed component. By decreasing the sweep speed in this manner, it becomes possible to suppress the occurrence of the change of the output axis during the engine torque estimating control.

A concrete description will be given using FIG. 5. FIG. 5 shows an example of the sweep speed of the MG1 torque. In FIG. 5, a horizontal axis shows a proportion of the present MG1 torque to the predicted MG1 torque (%), and a vertical axis shows the sweep speed (it shows an absolute value). In such a case that the proportion of the present MG1 torque to the predicted MG1 torque is less than 80(%), the ECU 4 changes the MG1 torque at the sweep speed V1. Meanwhile, in such a case that the proportion of the present MG1 torque to the predicted MG1 torque is not less than 80(%), the ECU 4 changes the MG1 torque at the sweep speed V2 which is slower than the sweep speed V1.

The sweep speed V2 is set based on a response required to stop the teeth of the fourth revolution component before the teeth of the fourth revolution component collide with the opposite sides of the teeth of the fixed component at the time that the ECU 4 stops applying the MG1 torque by detecting the phase change between the fourth revolution component and the fixed component. Additionally, it is not limited that the sweep speed is set to two stages. The sweep speed which is divided into three or more stages may be used, and the sweep speed which is not divided into stages but is continuously changed may be used.

Figure 6:
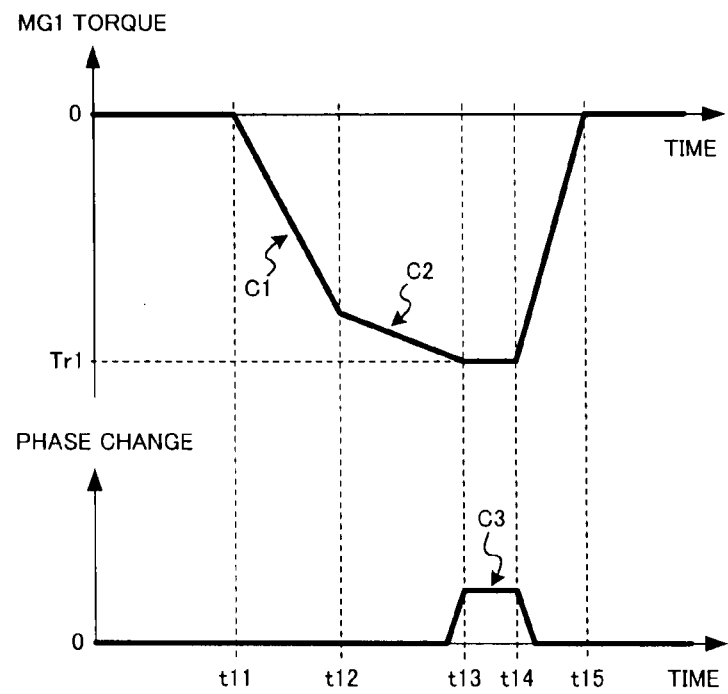
FIG. 6 shows a time chart of an engine torque estimating control.

FIG. 6 shows a time chart of the engine torque estimating control according to this embodiment. The change of the MG1 torque is shown in the upper part in FIG. 6, and the phase change between the fourth revolution component and the fixed component is shown in the lower part in FIG. 6. The phase change corresponds to the detecting signal S40 output by the revolution sensor 40.

At a time t11, the engine torque estimating control is started. Namely, the MG1 torque opposite to the torque which acts between the fourth revolution component and the fixed component is applied to the fourth revolution component. Concretely, between the time t11 and a time t12, the MG1 torque gradually decreases as shown by a reference numeral C1. In this case, the MG1 torque is applied at the above-mentioned sweep speed V1. Then, after the time t12, the MG1 torque gradually decreases as shown by a reference numeral C2. In this case, the MG1 torque is applied at the above-mentioned sweep speed V2 which is slower than the sweep speed V1.

Afterward, at a time t13, the phase change between the fourth revolution component and the fixed component is occurred as shown by a reference numeral C3. This means that the support torque of the engagement mechanism becomes substantially 0. In other words, this means that the MG1 torque Tr1 at the time t13 substantially balances with the reaction force of the engine torque. Therefore, it becomes possible to estimate the engine torque with high accuracy based on the MG1 torque Tr1. Since the MG1 torque is changed at the sweep speed V2 which is appropriately set in the above-mentioned manner, the phase change becomes smaller than the backlash.

While the above phase change is occurring (concretely, between the time t13 and a time t14), the MG1 torque Tr1 is maintained. Then, at the time t14, the control for increasing the MG1 torque is executed. Namely, the control is executed so that the applied MG1 torque becomes 0. Then, the MG1 torque becomes substantially 0 at a time t15, and the engine torque estimating control is ended at this time.

Preferably, when the ECU 4 sweeps the MG1 torque in the above-mentioned manner during the engine torque estimating control, the ECU 4 makes the second motor generator MG2 apply the torque (hereinafter referred to as "MG2 torque") so that the MG1 torque is compensated. This is because, when the MG1 torque is swept during in the fixed gear ratio mode, the change of the output axis (the shock of the output axis) sometimes occurs by changing a torque transmitted to the output axis 3 according to a relation of the gear ratio. Therefore, by compensating the change of the torque transmitted to the output axis 3 by the MG2 torque in this manner, it becomes possible to efficiently suppress the occurrence of the change of the output axis during the engine torque estimating control.

Figure 7:
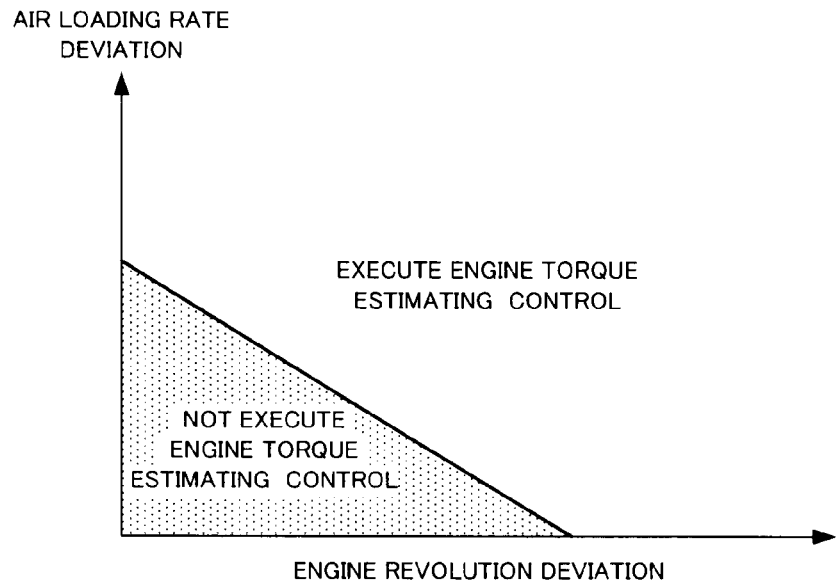
FIG. 7 shows a map which represents an execution condition of an engine torque estimating control.

Next, a description will be given of an execution condition of the engine torque estimating control by using FIG. 7. In this embodiment, when a change of an operation point of the engine 1 becomes equal to or larger than a predetermined value, i.e., when the operation point substantially changes from the previous estimation of the engine torque, the ECU 4 executes the engine torque estimating control. In such a case that the operation point substantially changes, since a reliability of the value of the previously estimated engine torque tends to decrease, it is preferable to execute the engine torque estimating control. Meanwhile, in such a case that the operation point does not substantially change, the previously estimated engine torque can be used, and it can be said that it is unnecessary to execute the engine torque estimating control. Additionally, in such a case that the operation point does not substantially change, it can be said that it is preferable to suppress a deterioration of fuel consumption due to the increased energy use of the first motor generator MG1, which is caused by the execution of the engine torque estimating control. Preferably, the engine torque estimating control is executed in such a case that the change of the instruction of the engine power is small (i.e., a driving condition is stable).

A concrete description will be given using FIG. 7. In FIG. 7, a horizontal axis shows an engine revolution deviation, and a vertical axis shows an air loading rate deviation. The air loading rate deviation is an index correlated with the change of the engine torque. In this example, the ECU 4 determines the execution of the engine torque estimating control by using a map as shown in FIG. 7 represented by the engine revolution deviation and the air loading rate deviation. Namely, the ECU 4 determines the execution of the engine torque estimating control based on the operation point of the engine 1 defined by the engine revolution deviation and the air loading rate deviation. In details, in such a case that the operation point of the engine 1 is positioned in a hatching area, the ECU 4 does not execute the engine torque estimating control. In such a case that the operation point of the engine 1 is not positioned in a hatching area in FIG. 7, the ECU 4 executes the engine torque estimating control.

Figure 8:
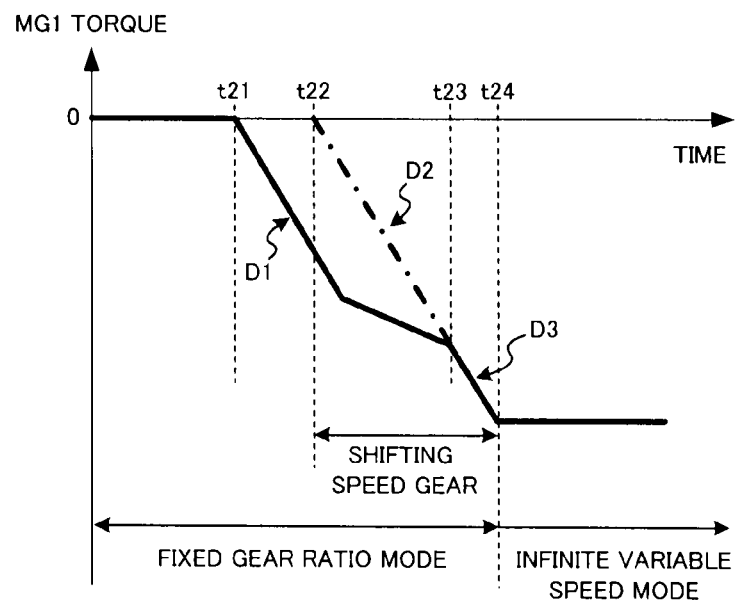
FIG. 8 shows a time change of a MG1 torque in case of executing a speed change control during an engine torque estimating control.

Next, a description will be given of a speed change control from the fixed gear ratio mode to the infinite variable speed mode during the engine torque estimating control by using FIG. 8. In this embodiment, even while the ECU 4 is sweeping the MG1 torque during the engine torque estimating control, if a speed change request to the infinite variable speed mode is issued, the ECU 4 executes the speed change control for changing the speed from the fixed gear ratio mode to the infinite variable speed mode at the same time. Concretely, the ECU 4 calculates the MG1 torque necessary to change the speed to the infinite variable speed mode (hereinafter referred to as "speed change request MG1 torque"), and the ECU 4 determines an instruction value of the first motor generator MG1 based on a relation between the speed change request MG1 torque and the MG1 torque during the engine torque estimating control (hereinafter referred to as "engine torque estimating MG1 torque" in order to distinguish it from the "speed change request MG1 torque"). Then, the ECU 4 executes the speed change control.

More concretely speaking, in such a case that an absolute value of the speed change request MG1 torque is equal to or smaller than an absolute value of the engine torque estimating MG1 torque, the ECU 4 does not apply the speed change request MG1 torque to the instruction value. Namely, the ECU 4 does not make the first motor generator MG1 apply the speed change request MG1 torque, but the ECU 4 makes the first motor generator MG1 apply the engine torque estimating MG1 torque. In other words, the ECU 4 continues the engine torque estimating control. Meanwhile, when the absolute value of the speed change request MG1 torque becomes larger than the absolute value of the engine torque estimating MG1 torque, the ECU 4 ends the engine torque estimating control and applies the speed change request MG1 torque to the instruction value. Namely, the ECU 4 switches the torque applied by the first motor generator MG1 from the engine torque estimating MG1 torque to the speed change request MG1 torque. By executing the speed change control in this manner, it becomes possible to quickly execute the speed change from the fixed gear ratio mode to the infinite variable speed mode during the engine torque estimating control. In other words, it is possible to prevent limp of the speed change.

A concrete description will be given using FIG. 8. FIG. 8 shows a time change of the MG1 torque in case of executing the speed change control during the engine torque estimating control. First, at a time t21, the engine torque estimating control is started. Concretely, after the time t21, the MG1 torque (the engine torque estimating MG1 torque) is applied by the first motor generator MG1 as shown by a reference numeral D1. Afterward, at a time t22, the speed change request from the fixed gear ratio mode to the infinite variable speed mode is issued. Then, after the time t22, the speed change request MG1 torque necessary to change the speed to the infinite variable speed mode is calculated as shown by a reference numeral D2. However, between the time t22 and a time t23, since the absolute value of the speed change request MG1 torque is equal to or smaller than the absolute value of the engine torque estimating MG1 torque, the speed change request MG1 torque is not applied to the instruction value. In other words, the engine torque estimating MG1 torque is used as the instruction value.

Afterward, at the time t23, the absolute value of the speed change request MG1 torque becomes larger than the absolute value of the engine torque estimating MG1 torque. Therefore, at this time, the engine torque estimating control is ended, and the speed change request MG1 torque is applied to the instruction value. Namely, as shown by a reference numeral D3, the torque applied by the first motor generator is switched from the engine torque estimating MG1 torque to the speed change request MG1 torque. Afterward, at a time t24, since the speed change request MG1 torque becomes a predetermined torque, the speed change from the fixed gear ratio mode to the infinite variable speed mode is executed. The speed change from the fixed gear ratio mode to the infinite variable speed mode is basically executed by releasing the engagement of the engagement mechanism (the fourth revolution component and the fixed component).

[Engine Torque Estimating Control Process]

Next, a description will be given of an engine torque estimating control process according to the embodiment, with reference to FIG. 9. FIG. 9 is a flow chart showing the engine torque estimating control process. This process is repeatedly executed by the ECU 4.

First, in step S101, the ECU 4 obtains the operation state information. Concretely, the ECU 4 obtains the number of revolutions of each component, the states of the engaging components, e.g., the torque, the brake unit 7 and the clutch, the operation of the accelerator, the brake and the shift by the driver, and the states of the battery, the motor generators MG1 and MG2 and the inverter 31, as the operation state information. Then, the process goes to step S102.

In step S102, the ECU 4 determines whether or not the vehicle is traveling in the fixed gear ratio mode. Concretely, the ECU 4 determines whether or not the vehicle is traveling in the fixed gear ratio mode, based on the operation state information obtained in step S101. For example, the ECU 4 executes the determination based on whether or not the relation of the number of revolutions shown in FIG. 3 is satisfied. When the vehicle is traveling in the fixed gear ratio mode (step S102; Yes), the process goes to step S103. Meanwhile, when the vehicle is not traveling in the fixed gear ratio mode (step S102; No), i.e., when the vehicle is traveling in the infinite variable speed mode, the process goes out of the flow.

In step S103, the ECU 4 determines whether or not it is the situation to execute the engine torque estimating control. Concretely, the ECU 4 executes the determination by using such a condition that the operation point substantially changes from the previous estimation of the engine torque and the change of the instruction of the engine power is small as the execution condition of the engine torque estimating control. For example, the ECU 4 executes the determination using the map shown in FIG. 7. When the execution condition of the engine torque estimating control is satisfied (step S103; Yes), i.e., when the operation point substantially changes and the change of the instruction of the engine power is small, the process goes to step S104. Meanwhile, when the execution condition of the engine torque estimating control is not satisfied (step S103; No), the process goes out of the flow.

In step S104, the ECU 4 calculates the speed to sweep the engine torque estimating MG1 torque (the sweep speed). Concretely, the ECU 4 calculates the sweep speed based on the relation between the present engine torque estimating MG1 torque and the predicted MG1 torque (the target torque). For example, the ECU 4 determines the sweep speed V1 or the sweep speed V2, based on the proportion of the present engine torque estimating MG1 torque to the predicted MG1 torque (refer to FIG. 5). Afterward, the process goes to step S105.

In step S105, the ECU 4 executes the control for estimating the engine torque. Concretely, the ECU 4 sweeps the engine torque estimating MG1 torque while monitoring the phase change between the fourth revolution component and the fixed component (for example, obtained by the revolution sensor 40). Then, the ECU 4 estimates the engine torque based on the engine torque estimating MG1 torque at the time that the phase change is smaller than the backlash between the teeth of the fourth revolution component and the teeth of the fixed component. Additionally, in order to prevent the occurrence of the change of the output axis at the time of sweeping the engine torque estimating MG1 torque, the ECU 4 executes the control for applying the MG2 torque by the second motor generator MG2 so that the engine torque estimating MG1 torque is compensated. When the above process ends, the process goes to step S106.

In step S106, the ECU 4 determines whether or not the speed change request to the infinite variable speed mode is issued. For example, the ECU 4 monitors the speed change request by using the vehicle speed and the driving force. When the speed change request to the infinite variable speed mode is not issued (step S106; Yes), the process goes out of the flow. When the speed change request to the infinite variable speed mode is issued (step S106; No), the process goes to step S107.

In the process after step S107, since the speed change request to the infinite variable speed mode is issued, the ECU 4 executes the process for changing the speed from the fixed gear ratio mode to the infinite variable speed mode. First, in step S107, the ECU 4 calculates the speed change request MG1 torque necessary to change the speed to the infinite variable speed mode. Concretely, the ECU 4 calculates the speed change request MG1 torque which balances with the reaction force of the engine torque. In this case, when there is a reliable estimated result of the engine torque at the present operation point, the ECU 4 uses the engine torque and calculates the speed change request MG1 torque. Therefore, it is possible to shorten the speed change time. Meanwhile, when there is not the reliable estimated result of the engine torque at the present operation point, the ECU 4 sweeps the MG1 torque and searches the speed change request MG1 torque. When the above process ends, the process goes to step S108.

In step S108, the ECU 4 determines whether or not the absolute value of the speed change request MG1 torque obtained in step S107 is larger than the absolute value of the engine torque estimating MG1 torque. Namely, the ECU 4 determines whether or not it is the situation to switch from the fixed gear ratio mode to the infinite variable speed mode. When the absolute value of the speed change request MG1 torque is larger than the absolute value of the engine torque estimating MG1 torque (step S108; Yes), the process goes to step S109. In this case, the ECU 4 ends the engine torque estimating control (step S109), and the ECU 4 applies the speed change request MG1 torque to the instruction value. Namely, the ECU 4 switches the torque applied by the first motor generator MG1 from the engine torque estimating MG1 torque to the speed change request MG1 torque. Afterward, the process goes out of the flow.

Meanwhile, when the absolute value of the speed change request MG1 torque is equal to or smaller than the absolute value of the engine torque estimating MG1 torque (step S108; No), the process goes out of the flow. In this case, the ECU 4 does not apply the speed change request MG1 torque to the instruction value. Namely, the ECU 4 does not make the first motor generator MG1 apply the speed change request MG1 torque, but the ECU 4 makes the first motor generator MG1 apply the engine torque estimating MG1 torque.

By the above-mentioned engine torque estimating control process, it is possible to estimate the engine torque with high accuracy during traveling in the fixed gear ratio mode. Therefore, it becomes possible to efficiently suppress the speed change shock by the speed change and the unbalance of the power input/output.

While the above embodiment disclosed such an example that the phase change is detected by the revolution sensor 40, it is not limited to this. As another example, instead of using the revolution sensor 40, the phase change can be predicted according to the gear ratio based on the phase of the first motor generator MG1 (obtained by a resolver) and the phase of the second motor generator MG2 (obtained by a resolver).

INDUSTRIAL APPLICABILITY

This invention can be used for a hybrid vehicle including an engine and a motor generator as a driving source.

The invention claimed is:

1. A drive control device for a vehicle comprising:
an engagement mechanism which includes a revolution component that has plural teeth and is revolved by an output torque of an internal combustion engine, and a fixed component that has plural teeth and engages with the revolution component;
a torque applying unit which applies a torque different from the output torque of the internal combustion engine, to the revolution component which receives the output torque of the internal combustion engine;
a first transmitting control unit which engages the engagement mechanism to make the engagement mechanism receive a reaction force of the output torque of the internal combustion engine, and simultaneously executes a control for transmitting the output torque of the internal combustion engine to wheels; and
a torque estimating control unit which executes a control for estimating the output torque of the internal combustion engine,
wherein the torque estimating control unit comprises:
a torque applying control unit which executes a control of the torque applied to the revolution component by the torque applying unit during executing the control by the first transmitting control unit;
a phase change detecting unit which detects a phase change between the revolution component and the fixed component in a direction of rotation during executing the control by the torque applying control unit; and
a torque estimating unit which estimates the output torque of the internal combustion engine based on the phase change detected by the phase change detecting unit and the torque applied by the torque applying unit by the control of the torque applying control unit during executing the control by the first transmitting control unit,
wherein the phase change detecting unit detects that a phase of the revolution component is changed in a direction opposite to a direction of the output torque of the internal combustion engine, by the torque applied by the torque applying unit which is opposite to the output torque of the internal combustion engine, in order to detect the phase change.

2. The drive control device for the vehicle according to claim 1,
wherein the torque applying control unit executes the control of the torque applied to the revolution component by the torque applying unit so that the phase change is smaller than a backlash between teeth of the revolution component and teeth of the fixed component.

3. The drive control device for the vehicle according to claim 1,
wherein, when a change of an operation point of the internal combustion engine becomes equal to or larger than a predetermined value, the torque estimating control unit executes the control for estimating the torque.

4. The drive control device for the vehicle according to claim 1, further comprising:
a second transmitting control unit which releases the engagement mechanism to make the torque applying unit receive a reaction force of the output torque of the internal combustion engine; and
a switching unit which switches from the control by the first transmitting control unit to the control by the second transmitting control unit, when an absolute value of the torque which the applying unit should apply in order to switch from the control by the first transmitting control unit to the control by the second transmitting control unit becomes larger than an absolute value of the torque applied by the torque applying unit during the control by the torque estimating control unit.

5. The drive control device for the vehicle according to claim 1,
wherein the torque applying control unit controls a speed of changing the torque applied by the torque applying unit based on a relation between the torque which the torque applying unit is presently applying and a target torque which the torque applying unit should apply to change the phase between the revolution component and the fixed component.

6. The drive control device for the vehicle according to claim 1, further comprising a unit which generates a torque so that the torque applied by the torque applying unit is compensated during the control by the torque applying control unit.

7. The drive control device for the vehicle according to claim 1,
wherein the torque applying unit is a motor generator.

8. The drive control device for the vehicle according to claim 1, wherein, during executing the control by the first transmitting control unit, the torque estimating unit estimates the output torque of the internal combustion engine based on the phase change detected by the phase change detecting unit and a torque opposite to a reaction force of the output torque of the internal combustion engine, which is applied by the torque applying unit by the control of the torque applying control unit.

9. The drive control device for the vehicle according to claim 1,
wherein the torque estimating control unit further includes a sweep speed calculating unit which calculates a sweep speed to sweep an engine torque estimating torque, and
wherein the control by the torque applying control unit includes sweeping the engine torque estimating torque at the sweep speed.

10. The drive control device for the vehicle according to claim 1,
wherein the torque applying control unit executes the control of the torque applied to the revolution component by the torque applying unit during traveling in a fixed gear mode.

11. The drive control device for the vehicle according to claim 1,
wherein the phase change detecting unit detects that the phase of the revolution component in the direction opposite to the direction of the output torque is changed from a state in which the revolution component is fixed by the engagement mechanism.

* * * * *